(12) United States Patent
Clerc et al.

(10) Patent No.: US 7,316,109 B2
(45) Date of Patent: Jan. 8, 2008

(54) LOBED EXHAUST DIFFUSER APPARATUS, SYSTEM, AND METHOD

(75) Inventors: James C. Clerc, Columbus, IN (US);
James A. Cramer, Columbus, IN (US);
J. David Dixon, Greenwood, IN (US);
Francois Ntone, Columbus, IN (US);
Patrick M. Klein, Madison, WI (US)

(73) Assignee: Fleetguard, Inc, Nashville, TN (US)

( * ) Notice: Subject to any disclaimer, the term of this patent is extended or adjusted under 35 U.S.C. 154(b) by 59 days.

(21) Appl. No.: 11/333,656

(22) Filed: Jan. 17, 2006

(65) Prior Publication Data

US 2007/0163249 A1 Jul. 19, 2007

(51) Int. Cl.
*F01N 3/021* (2006.01)
*F01N 7/08* (2006.01)
*F01N 7/20* (2006.01)

(52) U.S. Cl. .............. 60/311; 60/320; 60/324; 181/228; 239/601

(58) Field of Classification Search .............. 60/285, 60/311–314, 317, 320, 324; 239/504, 518, 239/601, 517; 181/228
See application file for complete search history.

(56) References Cited

U.S. PATENT DOCUMENTS

| | | | |
|---|---|---|---|
| 2,370,062 A * | 2/1945 | Ernest | 60/320 |
| 2,858,853 A * | 11/1958 | Albert | 239/601 |
| 2,919,720 A * | 1/1960 | Nicholls | 239/517 |
| 4,066,214 A | 1/1978 | Johnson | 239/265.19 |
| 4,077,206 A | 3/1978 | Ayyagari | 60/262 |
| 4,719,751 A * | 1/1988 | Kume et al. | 60/285 |
| 4,909,346 A | 3/1990 | Torkelson | 181/213 |
| 5,058,704 A * | 10/1991 | Yu | 181/262 |
| 5,611,203 A | 3/1997 | Henderson et al. | 60/605.2 |
| 5,755,092 A | 5/1998 | Dessale et al. | 60/262 |
| 5,884,472 A | 3/1999 | Presz, Jr. et al. | 60/262 |
| 6,233,920 B1 | 5/2001 | Presz, Jr. et al. | 60/230 |
| 6,425,382 B1 | 7/2002 | Marthaler et al. | 123/568.17 |
| 6,776,146 B1 | 8/2004 | Ricart-Ugaz et al. | 123/568.17 |
| 6,810,867 B2 | 11/2004 | Schmid et al. | 123/568.17 |
| 6,889,673 B2 | 5/2005 | Bender et al. | 123/568.17 |
| 7,028,663 B1 * | 4/2006 | Kim | 60/324 |
| 2006/0112683 A1 * | 6/2006 | Hubuer | 60/324 |
| 2007/0095057 A1 * | 5/2007 | Field et al. | 60/317 |

* cited by examiner

*Primary Examiner*—Willis R. Wolfe, Jr.
(74) *Attorney, Agent, or Firm*—Kunzler & McKenzie (57) ABSTRACT

A lobed exhaust diffuser apparatus, system, and method configured to cool exhaust gases from an internal combustion engine comprises a diffuser having a proximal end, configured to receive exhaust gases from the engine, and a distal end, configured to expel the exhaust gases into the atmosphere. A plurality of lobes are disposed on the distal end such that at least a portion of the exhaust gases pass through the lobes, increasing the interaction surface area between the exhaust gases and the atmosphere, allowing for more rapid diffusion and entrainment between exhaust gases and atmospheric gases, resulting in more rapid cooling of the exhaust gases.

20 Claims, 7 Drawing Sheets

LOBED EXHAUST DIFFUSER APPARATUS, SYSTEM, AND METHOD

BACKGROUND OF THE INVENTION

1. Field of the Invention

This invention relates to exhaust systems, and more particularly to apparatuses, systems, and methods for cooling exhaust gas as it leaves an enclosed exhaust stream.

2. Description of the Related Art

This patent application is related to application serial number <serial number> titled "Enclosed Volume Exhaust Diffuser Apparatus, System, and Method," filed on the same date as the present application, attorney docket No. 1900.2.15 and client docket No. 8-02-4819, and which is incorporated herein in its entirety.

Environmental regulations are becoming increasingly strict with regard to engine exhaust emissions such as nitrogen oxides (NOx) and particulate matter. In the United States, the U.S. Environmental Protection Agency will begin enforcing new, more stringent, environmental regulations with regard to diesel engine particulate emissions in 2007, which has occasioned the need for diesel particulate filters and/or other exhaust treatment devices such as NOx adsorbers to be placed in the exhaust stream before the exhaust is permitted to enter the atmosphere.

In most cases, an exhaust treatment system must initiate regeneration of particulate filters, NOx adsorbers, and other exhaust treatment devices from time to time as the devices fill up with soot, NOx, or the like. In the case of a particulate filter, as one example, this is done by increasing the temperature of the filter to a level where the soot is oxidized, above 400 C, and maintaining that temperature for several minutes or longer, depending on circumstances including the size of the filter, the amount of soot on the filter, the uniformity level of the soot, etc.

The high filter temperatures required for regenerations of this type increase the temperature of the exhaust, particularly at stationary or low-speed operation, meaning the exhaust leaves the tailpipe of the vehicle at a much higher temperature than it would during normal operation. This creates a potential safety hazard with regard to the heat flux of the gases leaving the tailpipe and creating discomfort or injury to humans, animals, or plants in proximity. It also increases the surface temperature of exhaust train components.

One way to deal with the problem would be to warn the operator of the vehicle or machine in which the engine and exhaust treatment system is installed of expelled exhaust temperatures reaching high levels, enabling the operator to take steps to mitigate the situation, such steps potentially including moving the apparatus away from sensitive objects, initiating a cooling procedure, etc. This, however, would require detailed and expensive sensors and controls, would require operator intervention, and in any case the mitigation options for the operator would be relatively limited. If possible, it would be better that the exhaust gas be continually cooled before or as it leaves the tailpipe such that its temperatures never reach dangerous levels in the first place.

Treating exhaust to mitigate harmful consequences is nothing new, of course: mufflers and resonance filters have existed for decades for sound mitigation, and catalyst filters, particulate filters and the like have been and are being developed for substance emission control. The general problem of heat mitigation as the exhaust enters the atmosphere, however, is a relatively new one requiring novel approaches. The problem has been addressed in certain limited circumstances, such as exhaust temperature mitigation of fire trucks when they are pumping water. Some fire trucks (though not all) are equipped with a water spray device at the exhaust outlet for exhaust cooling, but such a scheme is limited to a situation where there is a ready water supply as well as experienced firefighters with hoses in hand rather than a single machine operator inexperienced in such situations.

From the foregoing discussion, it should be apparent that a need exists for cooling exhaust gases as they leave the tailpipe of an engine-driven machine, particularly one containing a diesel engine and particulate filter or other treatment device requiring regeneration. Certain types of vocational vehicles not using the emissions control devices discussed above can also benefit from cooled exhaust gases.

SUMMARY OF THE INVENTION

The present invention has been developed in response to the present state of the art, and in particular, in response to the problems and needs in the art that have not yet been fully solved by currently available systems. Accordingly, the present invention has been developed to provide and apparatus, system, and method for cooling exhaust gases that overcome many or all shortcomings in the art.

In one aspect of the invention, an apparatus for cooling exhaust gases from an internal combustion engine includes a diffuser having a proximal end and a distal end. The proximal end is configured to receive exhaust gases from the engine, and the distal end is configured to expel the exhaust gases into the atmosphere. A plurality of lobes are disposed at least partially on the distal end, the lobes configured such that at least a portion of the exhaust gases pass through the lobes. In one embodiment, the circumference of the distal end is greater than the circumference of the proximal end, and the cross-sectional area of the distal end is approximately equal to the cross-sectional area of the proximal end.

In a further embodiment, a block is provided within the lobes, the block configured to at least partially prevent the exhaust gases from passage through a central space between the lobes.

In a further aspect of the invention, a method of cooling exhaust gases includes urging the exhaust gases through a first passage, urging the exhaust gases through a plurality of lobes, and expelling the exhaust gases from the lobes to the atmosphere. In one embodiment, a portion of the exhaust gases is urged through the lobes adjacent approximately the entire inner surfaces of the lobes, such that the flow of the exhaust gases is approximately uniform.

In a further aspect of the invention, a diesel engine exhaust treatment and cooling system includes an exhaust pipe substantially containing and directing exhaust gases generated by the engine and an exhaust treatment mechanism disposed on the exhaust pipe. The exhaust treatment mechanism is configured to modify the composition of the exhaust gases. A regeneration mechanism operatively attached to the exhaust treatment mechanism is configured to regenerate the exhaust treatment mechanism from time to time. A cooling mechanism disposed on the housing downstream of the exhaust treatment mechanism comprises a plurality of lobes and is configured to receive the exhaust gases from the exhaust pipe and expel them to the atmosphere.

Reference throughout this specification to features, advantages, or similar language does not imply that all of the features and advantages that maybe realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided to impart a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figures 1, 2A, 2B, 2C:
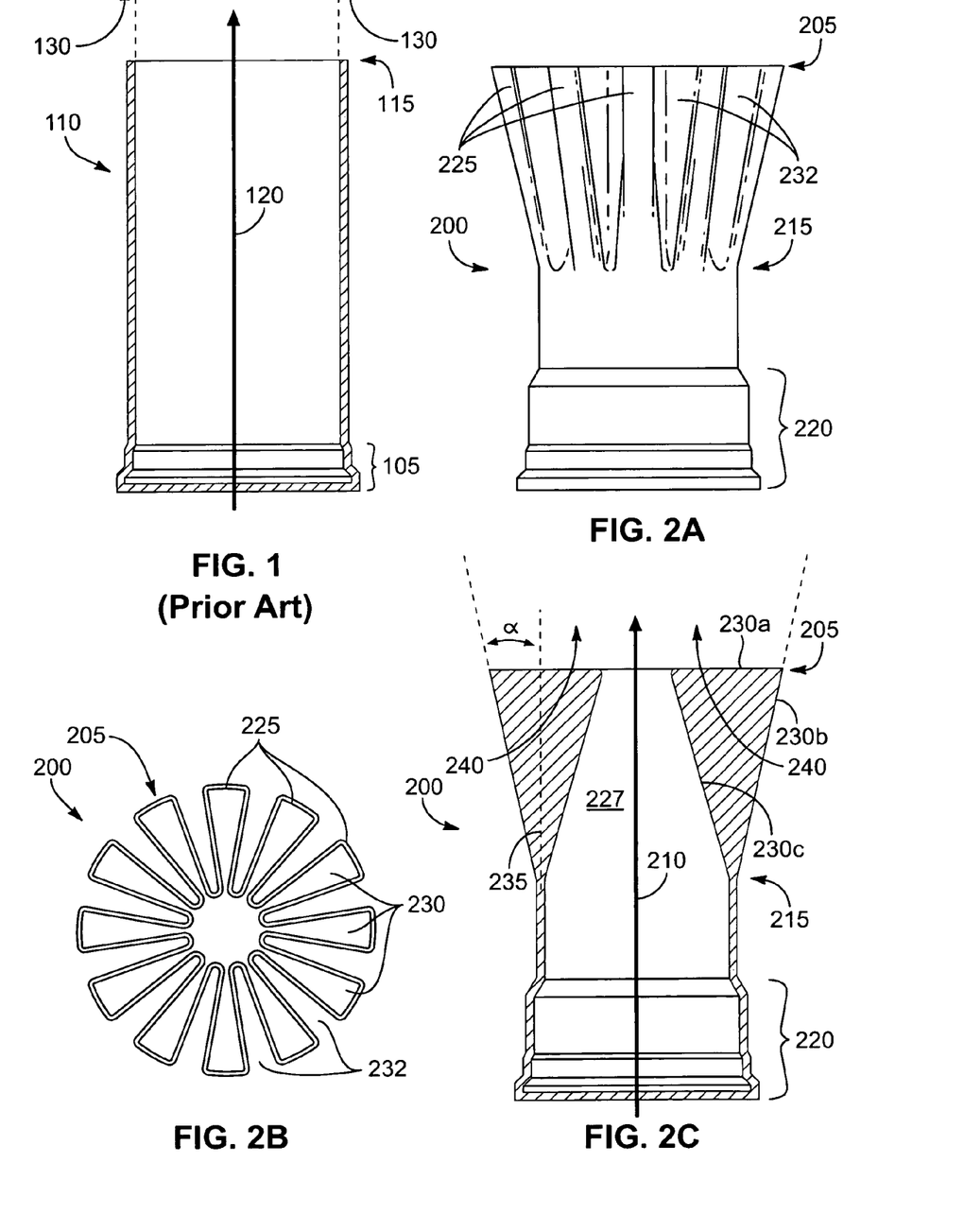
FIG. 1 (prior art) is a side cross-sectional view of a standard exhaust tailpipe.
FIG. 2A is a side elevational view of one embodiment of an exhaust diffuser according to the present invention.
FIG. 2B is a top plan view of the diffuser of FIG. 2A.
FIG. 2C is a side cross-sectional view of the diffuser of FIG. 2A.

FIG. 1 illustrates a cylindrical exhaust gas tailpipe 110, standard in the art. The tailpipe 110 attaches to an exhaust pipe or other exhaust train component (such as a muffler) via a connector 105, as is known, or alternatively may simply be of unitary construction with the exhaust component train. Exhaust gases pass through the tailpipe 110 in the direction of the arrow 110, entering the atmosphere at the distal end 115 of the tailpipe 110.

In operation, the exhaust gases emitted from an engine operatively connected to the tailpipe 110 enter the tailpipe 110 from an exhaust pipe, exhaust treatment device, or other exhaust train component or passage, and are expelled into the atmosphere. The exhaust gases enter the atmosphere in substantially cylindrical shape (the shape of the tailpipe 110), and are diffused and cooled as they interact with cooler atmospheric gases.

As the exhaust gases travel farther from the tailpipe 110, they are slowed and diluted by atmospheric gases. The atmospheric gases are also entrained into the exhaust gases, generally in the direction of the arrows 130. Entrainment of atmospheric gases occurs at the intersection between the fast-flowing exhaust gases and the usually slower-moving atmospheric gases—as mentioned above, in the shape of a cylinder, especially near the distal end 115 of the tailpipe 110. For entrainment to occur, the atmospheric gases must obtain approximately the same amount of momentum as the exhaust gases.

The farther from the distal end 115 the exhaust gases travel, the more they are diluted and slowed by the atmospheric gases, making entrainment of the atmospheric gases into the increasingly diffuse exhaust stream easier, until at some distance from the tailpipe 110 the exhaust gases are completely diluted by and diffused into the atmosphere.

FIGS. 2A-2C illustrate an embodiment of an exhaust gas diffuser 200 according to the present invention, with FIG. 2B showing only the diffuser's distal end, other details being omitted for clarity. The diffuser 200 has an outlet or distal end 205 whereby exhaust gases enter the atmosphere, as shown by the arrow 210 in FIG. 2C. The proximal end 215 of the diffuser 200 may be unitary with the rest of the exhaust train, may attach to an exhaust pipe via a connector 220 similar in construction and mode of use to the connector 105, as is known, or attach directly to an exhaust treatment device, as desired and as circumstances and construction of the particular machine dictate. The diffuser 200 may be connected to an existing tailpipe, extending the tailpipe, or be constructed together with the rest of the exhaust train, making the diffuser 200 itself the original tailpipe, with similar results in operation.

The distal end 205 of the diffuser 200 is fluted, creating a series of lobes 225, which are collectively disposed annularly around an internal space 227. The lobes 225 extend from the proximal end 215 to the distal end 205, becoming larger in cross-section nearer the distal end, resulting in an increasing axial or longitudinal taper of the lobes from the proximal end 215 to the distal end 205.

The lobes 225 each define a volume 230, with interstitial spaces 232 disposed between the lobes 225. "Lobe" as used herein means a projection or subdivision disposed on the distal end 205 of the diffuser, the lobe being a projection or subdivision of the exhaust passage defined by the proximal end 215. Various types, sizes, and shapes of lobes are possible, some of which are described in connection with FIGS. 6-12 below. The lobes may or may not be connected to each other, but in any case are at least partially spaced from each other. In one embodiment the lobe volume 230 is triangular in cross-section, as shown in FIG. 2C, with a cross-sectional top 230a and cross-sectional sides 230b and 230c. The sides 230b are angled at an angle a from a vertical line 235 extending perpendicularly from the top 225a. The angle $\alpha$ is 20 degrees in one embodiment. This construction of the lobes 225 makes the internal space 227 of a frusto-conical shape. The interstitial spaces 232 are of similar shape to the lobe volumes 230.

The lobes 225 also taper from the radial center of the diffuser 200 to the outer radial edge of the diffuser 200, as can be seen most clearly in FIG. 2B.

In one embodiment, the diffuser 200 comprises twelve (12) lobes 225, each extending axially approximately four inches from the proximal end 215 to the distal end 205. The proximal end 215 is approximately four to five inches in diameter, with the distal end 205 being approximately six inches in diameter. Other dimensions and configurations are possible, some of which are, without limitation, discussed below. For example, the lobes 225 may be axially lengthened or radially thickened, with shape and width also modified. In the specific embodiment shown in FIG. 2, the angle of the side 230b is limited to approximately 20 degrees in order that the flow of exhaust gases through the lobes 225 is relatively smooth and uniform. A larger angle given the specific geometry of the embodiment shown in FIG. 2 may result in more exhaust gases pulling away from the sides 230b of the lobe volumes 230, causing more flow-hampering eddies in the gas flow. Other configurations, dimensions, and embodiments will create different requirements for optimum performance.

In one embodiment, for example, the collective cross-sectional area of the distal end 205, which includes the lobes 225 (but not the interstitial spaces 232), is approximately equal to the cross-sectional area of the proximal end 215. In this embodiment, and given the specific geometry and dimensions of the diffuser 200, if the area of the distal end 205 is significantly smaller than the area of the proximal end 215, the exhaust gas jets away from the distal end 205 at an increased velocity, making it more difficult to entrain atmospheric gases into the exhaust gases. Other configurations including increased cross-sectional area of the distal end 205 over the proximal end 215 are possible and will create different requirements for optimum performance.

The diffuser can be manufactured from stainless steel or other material, such as steel or aluminum-coated steel, as required by the specific application.

The diffuser may be preceded in the exhaust train by one or more exhaust treatment mechanisms, an aspirating flow apparatus (known in the art), or other devices, and may be connected directly thereto or spaced from such devices by piping of variable length.

In operation, the exhaust gases emitted from an engine operatively connected to the diffuser 200 enter the diffuser 200 from an exhaust pipe, exhaust treatment device, or other exhaust train component or passage, and are expelled into the atmosphere. Rather than entering the atmosphere in cylindrical shape, however, as in FIG. 1, exhaust gases flowing through the diffuser 200 enter the atmosphere in the fluted shape of the distal end 205 depicted in FIG. 2B, and are diffused and cooled as they interact with cooler atmospheric gases.

As can be seen by comparing FIGS. 1 and 2, the circumference of the tailpipe 110 at its distal end 115, which defines the shape of the exhaust stream, is much smaller than the circumference of the diffuser 200 at its distal end 205 ("circumference" here not meaning necessarily a circle, but rather the actual line of intersection between the exhaust gases and atmospheric gases at the distal end—being in this case a shape resembling a flower). The sharply increased circumference of the distal end 205 over the distal end 115 results in much more area of intersection between the exhaust gases and the atmosphere, which in turn results in more efficient entraining and diffusion of the exhaust gases into the atmosphere.

In place of the inefficient entrainment of atmospheric gases into the exhaust gas cylinder of FIG. 1, the diffuser 200 provides for the atmospheric gases to enter the interstitial spaces 232, as shown by the arrows 240 in FIG. 2C, for more rapid entrainment, diffusion, and consequent cooling of the exhaust gases.

Figure 3A:
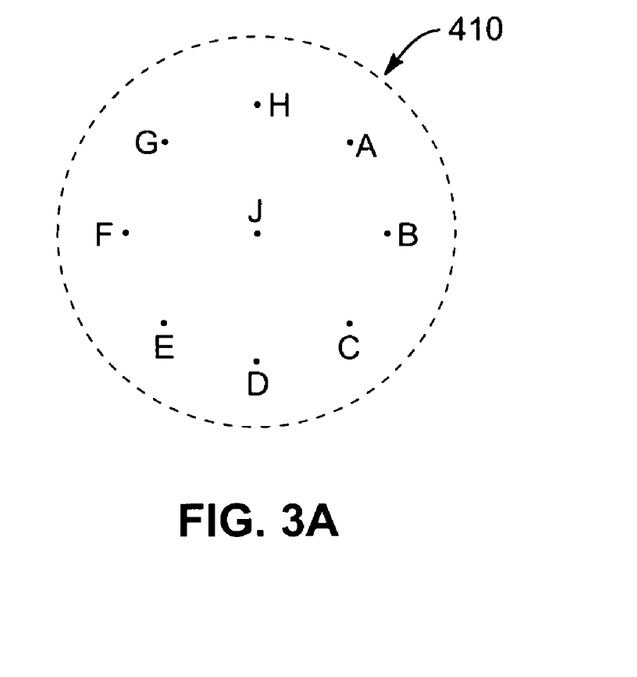
FIG. 3A is a front elevational view of a disc used in an exhaust gas temperature testing setup.
Figure 3B:
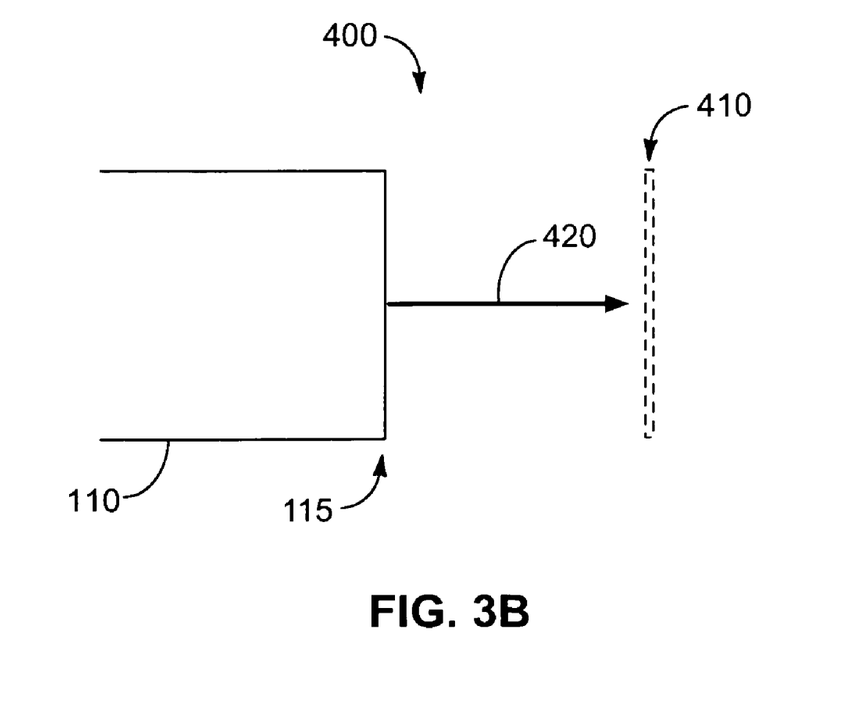
FIG. 3B is a schematic side elevational view of the testing setup used in FIG. 3A.

FIGS. 3A and 3B show a testing arrangement 400 for testing exhaust gas temperatures from the tailpipe 110 and the diffuser 200. As shown, in testing, the tailpipe 110 was placed with its distal end 115 facing a thermocouple array 410, the array 410 being arranged in a disc-shaped pattern, with thermocouples being placed at various points in the exhaust stream to measure temperature while minimizing disturbance of the exhaust flow. The array 410 was placed perpendicularly to the axial flow of exhaust gases from the tailpipe 110 (shown as arrow 420), six inches from the distal end 115. Temperature of the exhaust gas was determined at nine thermocouple points on the array 410: point J, in the center of the exhaust flow, and points A-H disposed annularly around point J, each a radial distance of 3.5 inches from point J.

The test was carried out using a medium-duty diesel truck using a cordierite ceramic particulate filter approximately 48 inches upstream of the distal end 115, during stationary regeneration of the particulate filter, with regeneration temperatures on the filter reaching 1022 degrees F or more. The ambient conditions were overcast, slight breeze, with a temperature of 75-85 F.

The testing arrangement was also carried out for the diffuser 200 in the same way and arrangement, and under the same conditions, except that the diffuser 200 with its distal end 205 was used instead of the tailpipe 110 with its distal end 115.

Figure 4:
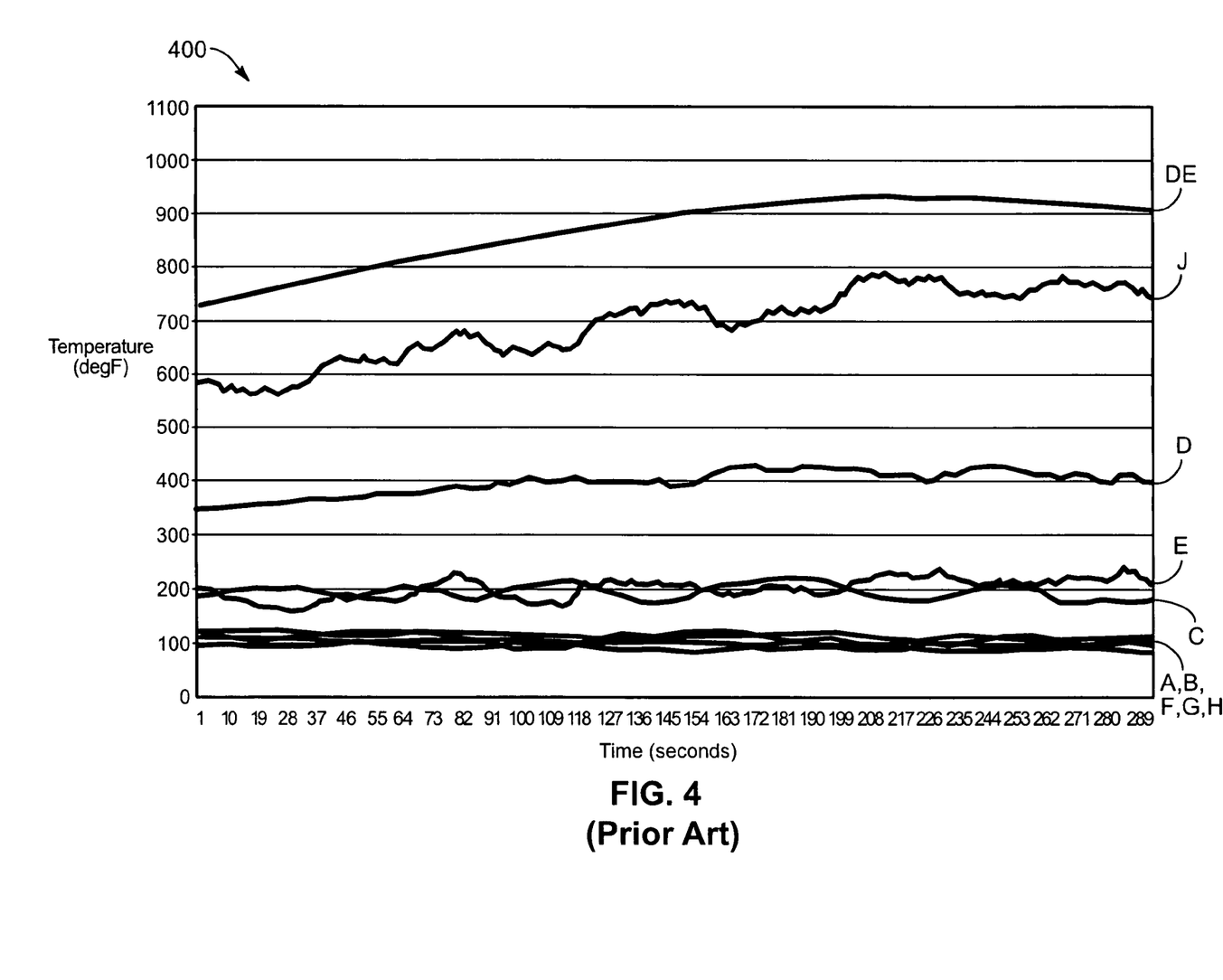
FIG. 4 (prior art) is a graph showing exhaust temperatures from the tailpipe of FIG. 1.

The results of the test during a time period of approximately 300 seconds using the tailpipe 110 are shown in FIG. 4 in graph 400, showing temperature as a function of time. The line DE represents the temperature of the exhaust flow measured at the distal end 115. The remaining lines A-H and J show the temperature of the exhaust gas as measured on the corresponding points on the thermocouple array 410.

Figure 5:
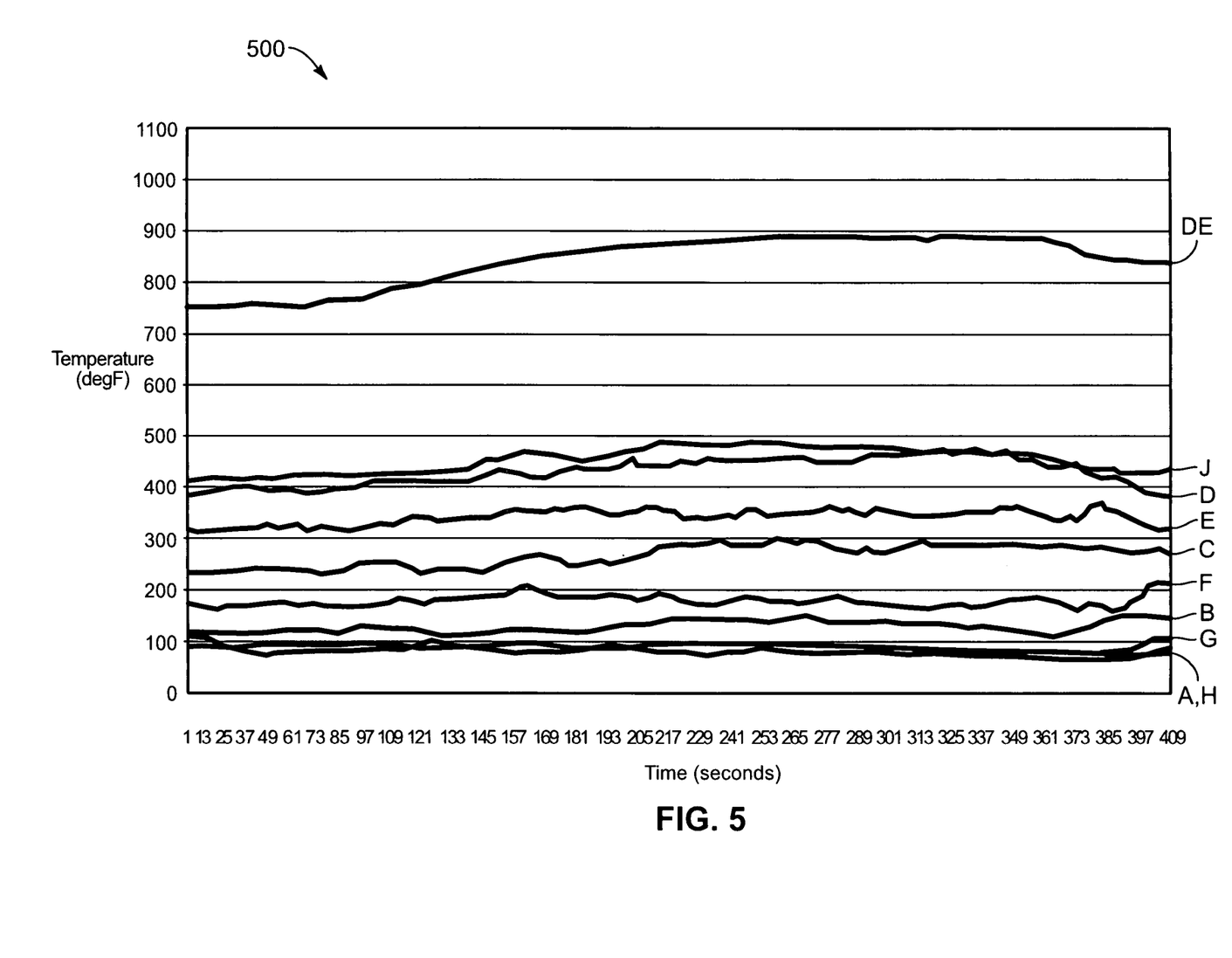
FIG. 5 is a graph showing exhaust temperatures from the diffuser of FIG. 2.

The results of the test during a time period of approximately 300 seconds using the diffuser 200 are shown in FIG. 5 in graph 400, showing temperature as a function of time. The line DE represents the temperature of the exhaust flow measured at the distal end 205. The remaining lines A-H and J show the temperature of the exhaust gas as measured on the corresponding points on the thermocouple array 410. It can be seen that the temperature in the radial center of the exhaust stream, at point J on the array 410, is significantly lower using the diffuser 200, indicating better entrainment of atmospheric gases into the exhaust gases and better diffusion of the exhaust gases into the atmosphere.

FIGS. 6-11 illustrate other embodiments of a fluted tailpipe or diffuser according to the present invention, all of the figures showing the distal end of the apparatus, with other details omitted for clarity. The embodiments shown are intended for use to diffuse engine exhaust gases directly with atmospheric gases.

Figure 6:
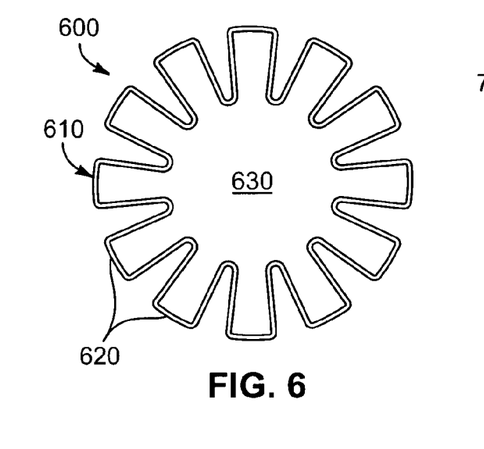
FIG. 6 is a top plan view of another embodiment of an exhaust diffuser according to the present invention, with a larger internal radial space at the distal end.

In FIG. 6, the distal end 610 of a diffuser 600 according to the present invention is fluted resulting in lobes 620 similar in construction to the lobes 225, except they extend radially inward less than the lobes 225, resulting in a larger internal space 630.

Figure 7:
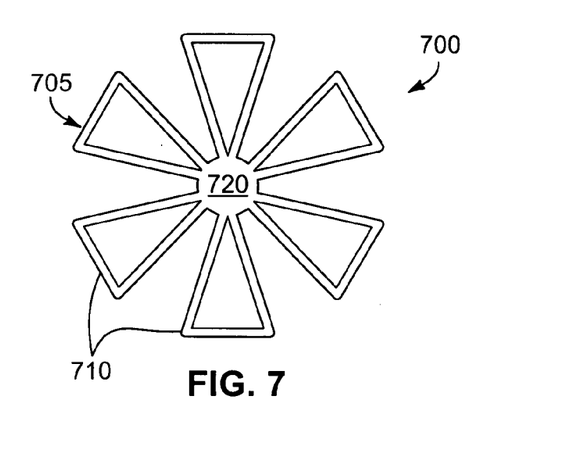
FIG. 7 is a top plan view of another embodiment of an exhaust diffuser according to the present invention, with the lobes connected and no internal radial space at the distal end.

In FIG. 7, the distal end 705 of a diffuser 700 according to the present invention has six lobes 710, with no internal space, each lobe 710 tapering radially inward to a point 720 at which all the lobes 710 connect. The distal end 705 of the diffuser 700 is not a single fluted outlet, since it comprises a plurality of separate lobes separate from one another (unlike a single fluted outlet, where the lobes are all one part of the same outlet), but remains within the scope of the invention as it increases the circumference of the distal end 705 and thus the intersection of the exhaust gases with the atmosphere, resulting in improved entrainment.

Figure 8:
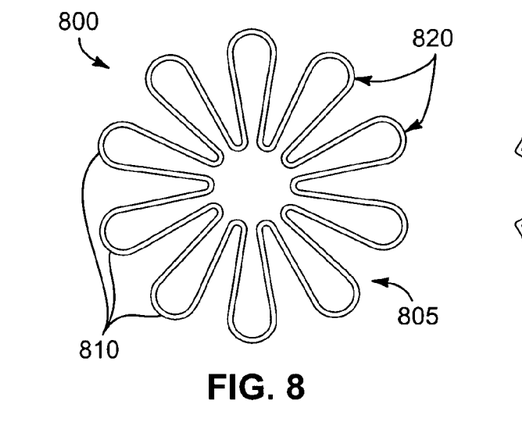
FIG. 8 is a top plan view of another embodiment of an exhaust diffuser according to the present invention, with rounded lobes.

In FIG. 8, the distal end 805 of a diffuser 800 according to the present invention has 10 lobes 810, rounded instead of squared at their outer radial surfaces 820. Rounded outer radial surfaces 820 may be desired in some configurations for better flow and fewer eddies in the exhaust stream.

Figure 9:
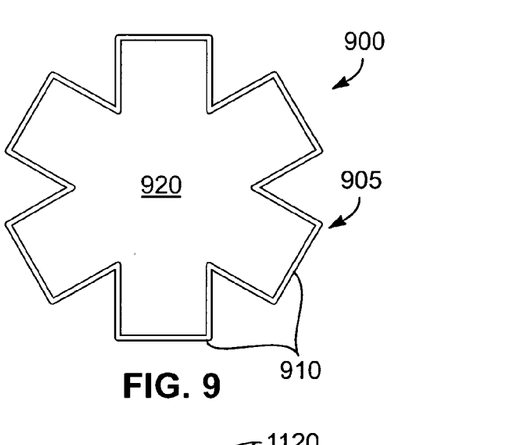
FIG. 9 is a top plan view of another embodiment of an exhaust diffuser according to the present invention, with non-tapered square lobes.

In FIG. 9, the distal end 905 of a diffuser 900 according to the present invention has six non-tapered square lobes 910, with a large internal space 920.

Figure 10:
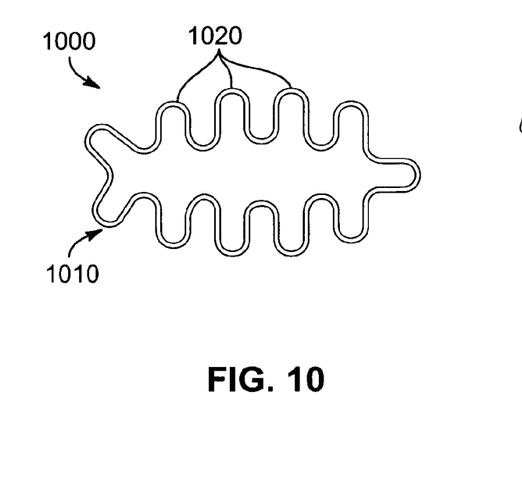
FIG. 10 is a top plan view of another embodiment of an exhaust diffuser according to the present invention, with a fluted oval opening.

In FIG. 10, the distal end 1010 of a diffuser 1000 according to the present invention is generally oval in shape, fluted to form lobes 1020. As exemplified in FIG. 10, the base shape of a diffuser or tailpipe according to the invention can be circular, oval, square, or otherwise while remaining within the scope of the invention.

Figure 11:
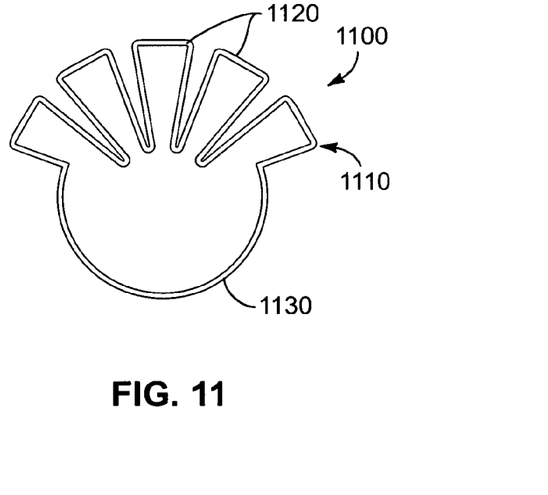
FIG. 11 is a top plan view of another embodiment of an exhaust diffuser according to the present invention, with lobes extending only partially around the circumference of the tailpipe.

In FIG. 11, the distal end 1110 of a diffuser 1100 according to the present invention has five lobes 1120, shaped generally like the lobes 225, the primary difference being that the lobes 1120 extend only partially around the circumference of the distal end 1110, the remainder 1130 being unfluted.

Figure 12:
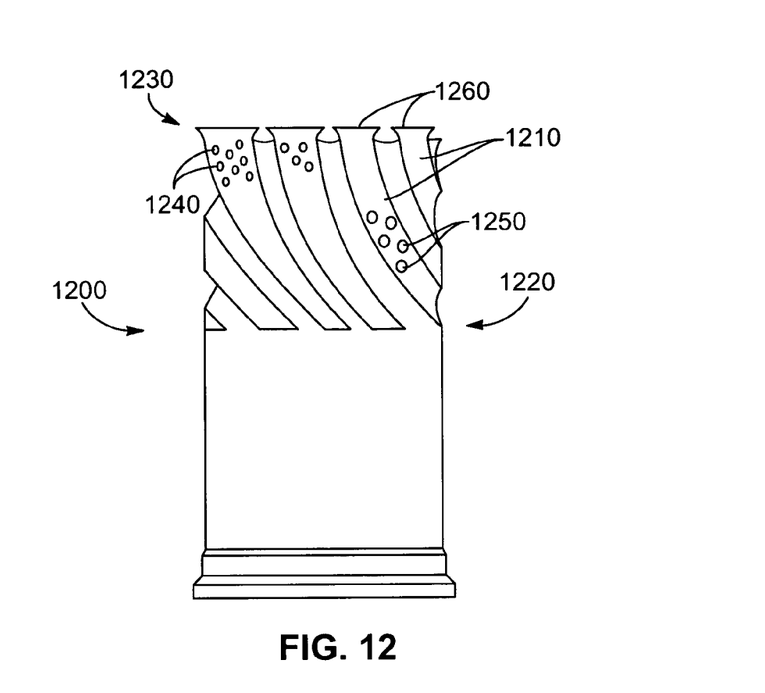
FIG. 12 is a side elevational view of another embodiment of an exhaust diffuser according to the present invention, with the lobes spirally wound.

FIG. 12 illustrates another embodiment of a diffuser 1200 according to the present invention, the diffuser 1200 being generally similar to the diffuser 200, with differences as follows:

The lobes 1210 of the diffuser 1200 do not extend axially straight from the diffuser 1200's proximal end 1220 to its distal end 1230; rather, they twist around forming a spiral pattern. The lobes 1210 also do not extend radially outward significantly beyond the proximal end 1220. The lobes 1210 also contain small perforations 1240 (only a few of which are shown for clarity) and large perforations 1250 (also only a few of which are shown for clarity). Perforations in the lobes or other areas of the diffuser may be desired in some configurations for further diffusion of exhaust gases. The lobes 1210 also contain ramped top edges 1260 for exhaust flow modification.

Figure 13A:
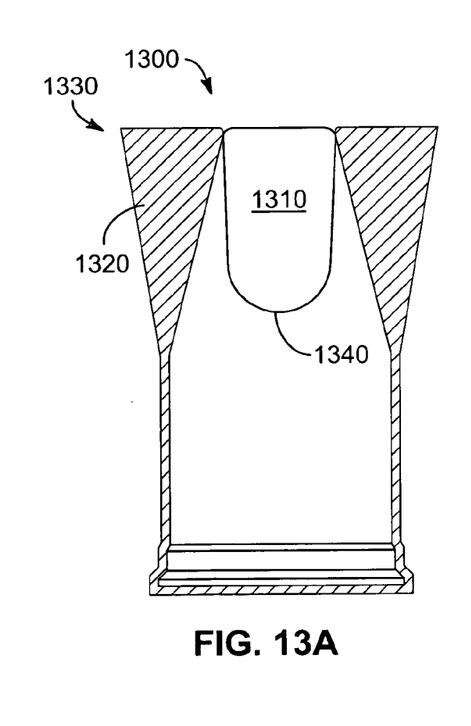
FIG. 13A is a side cross-sectional view of another embodiment of an exhaust diffuser according to the present invention, being the diffuser of FIG. 2 with an internal block.
Figure 13B:
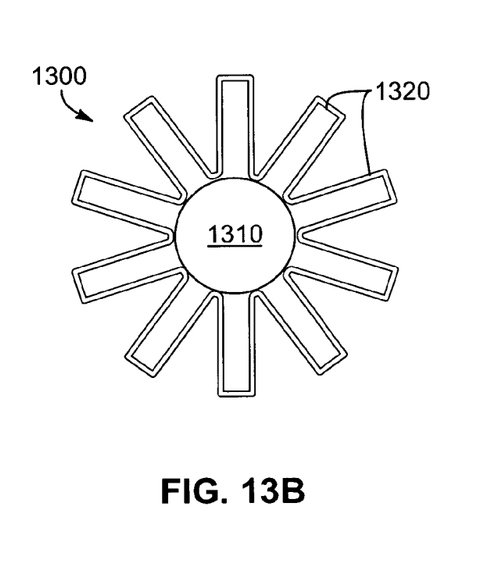
FIG. 13B is a top plan view of the diffuser of FIG. 10A.

FIGS. 13A and 13B show another embodiment of a diffuser 1300 according to the present invention, the diffuser 1300 being similar to the diffuser 200 except that the diffuser 1300 contains a block 1310 in the internal space 227 between the lobes 1320, the lobes 1320 being 10 in number and radially non-tapered at the diffuser 1300's distal end 1330. The block 1310 may be used in any embodiment of the invention containing an internal space similar to the internal space 227. The block 1310 is shaped for aerodynamic purposes at its proximal end 1340, and is attached to the radial inner portion of the lobes 1320 by welding or otherwise, filling the internal space 227 and serving to block the flow of exhaust gases therethrough, forcing the exhaust gases to exit the diffuser 1300 into the atmosphere solely through the lobes 1320. This arrangement may be desired in some configurations for optimum diffusion and entrainment, and to eliminate the center of the exhaust gas flow which tends to be hotter (as shown in FIGS. 4 and 5, line J) than points disposed radially outward from the center (lines A-H in FIGS. 4 and 5). Other embodiments of the block 1310 include a block that only partially prevents exhaust gases from flowing through the internal space 227.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 14:
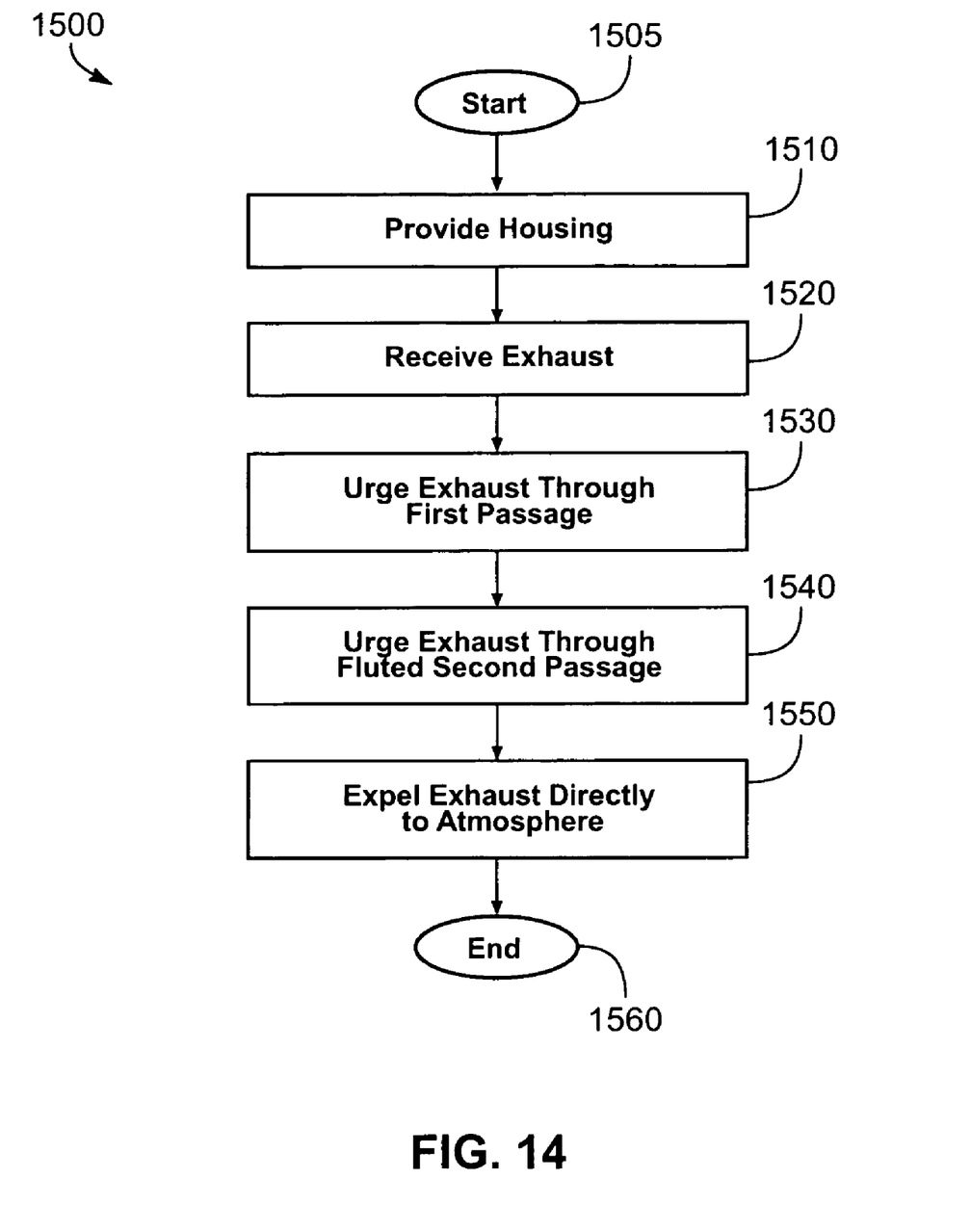
FIG. 14 is a schematic flow chart diagram illustrating an embodiment of a method of diffusing exhaust gases according to the present invention.

FIG. 14 illustrates one embodiment of a method of diffusing exhaust gases into the atmosphere. The method 1500 begins as depicted in block 1505, and a housing is provided 1510, the housing being an exhaust pipe, diffuser, exhaust treatment device, or some other component of an engine exhaust train, or the exhaust train in its entirety. The housing receives 1520 exhaust gases from an engine or upstream exhaust train component, and the exhaust is urged 1530 through a first passage in the housing, such as a standard cylindrical exhaust pipe or treatment device. The exhaust is then urged 1540 through a second, fluted, passage in the housing, such that the exhaust gases pass partially or completely through lobes formed by the fluting. The exhaust is then expelled 1550 directly to the atmosphere, and the method ends 1560.

The method 1500 may be modified and/or expanded by steps indicated in the description above or by additional steps apparent to those skilled in the art while remaining within the scope of the invention, such as adding a step of urging the exhaust gases through the second passage adjacent approximately the entire inner surface of the second passage, as described above, such that the flow of the exhaust gases is approximately uniform and avoids significant eddies or other fluid disturbances. Other possible additions include urging the gases through the first passage at a first cross-sectional area and through the second passage through a second cross-sectional area of approximately equal size to the first. Others include urging the gases through the first passage at a first cross-sectional circumference, and through the second passage through a second cross-sectional circumference, the second circumference being greater than the first.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for cooling exhaust gases from an internal combustion engine, the apparatus comprising:
   a diffuser having a proximal end and a distal end, the proximal end configured to receive exhaust gases from the engine, and the distal end configured to expel the exhaust gases into the atmosphere;
   a plurality of lobes disposed at least partially on the distal end, the lobes configured such that at least a portion of the exhaust gases passes through the lobes;
   wherein the lobes are longitudinally tapered, becoming larger as they approach the distal end from the proximal end; and
   wherein the cross-sectional area of the distal end is approximately equal to the cross-sectional area of the proximal end.

2. The apparatus of claim 1, wherein the circumference of the distal end is greater than the circumference of the proximal end.

3. The apparatus of claim 1, wherein the lobes are disposed in a substantially annular pattern, defining an internal space, and further comprising a block disposed in the internal space, the block configured to at least partially prevent the exhaust gases from passage through the internal space.

4. The apparatus of claim 1, wherein the lobes are disposed in an annular pattern, the lobes being substantially equal in size and shape and equidistant from each other, the lobes extending radially outward from the center of the distal end in cross section.

5. The apparatus of claim 1, wherein the apparatus is configured for use with a diesel engine, and wherein the proximal end of the apparatus is substantially cylindrical and approximately four to five (4-5) inches in diameter with the distal end being approximately six (6) inches in diameter, the lobes comprising twelve (12) lobes, each approximately four (4) inches in length.

6. The apparatus of claim 1, wherein each lobe is triangle-shaped in cross-section, with the top of the triangle corresponding to the top of the lobe at the distal end of the diffuser, wherein the radially outward side of the triangle is oriented approximately 20 degrees away from a center line perpendicular to the top of the triangle.

7. The apparatus of claim 1, further comprising a plurality of perforations disposed in the lobes.

8. The apparatus of claim 1, wherein the proximal end is substantially cylindrical and adapted for attachment to a substantially cylindrical exhaust pipe.

9. The apparatus of claim 8, wherein each lobe is radially tapered such that at the distal end of the diffuser each lobe is wider at its radial outer side and narrower at its radial inner side, each lobe further extending radially into the cylinder of the pipe and radially outward from the cylinder of the pipe.

10. An apparatus for diffusing exhaust gases, the apparatus comprising:
    a tailpipe having proximal and distal ends, the proximal end configured to receive exhaust gases and the distal end configured to expel the exhaust gases into the atmosphere;
    a plurality of lobes disposed at least partially on the distal end, the lobes configured such that at least a portion of the exhaust gases passes through the lobes
    wherein the lobes are longitudinally tapered, becoming larger as they approach the distal end from the proximal end; and
    wherein the distal end is approximately equal to the proximal end in cross-sectional area.

11. The apparatus of claim 10, wherein the circumference of the distal end is greater than the circumference of the proximal end.

12. The apparatus of claim 10, wherein the proximal end of the tailpipe is operatively attached to diesel engine for reception of exhaust gases generated by the engine, and further comprising a diesel particulate filter disposed between the engine and the tailpipe.

13. A method of cooling exhaust gases, the method comprising:
    urging the exhaust gases through a first passage;
    urging the exhaust gases through a plurality of longitudinally tapered lobes;
    wherein the exhaust gases pass through the first passage through a first cross-section and through the lobes at a second collective cross-section of approximately equal area as the first cross-section;
    expelling the exhaust gases from the lobes to the atmosphere.

14. The method of claim 13, further comprising generating the exhaust gases from an internal combustion diesel engine and urging the exhaust gases from the internal combustion diesel engine to the first passage.

15. The method of claim 13, wherein urging the exhaust gases through the lobes comprises urging a portion of the exhaust gases adjacent approximately the entire inner surfaces of the lobes, such that the flow of the exhaust gases is approximately uniform.

16. The method of claim 13, wherein the lobes are created by fluting of a second passage.

17. The method of claim 16, further comprising blocking passage of exhaust gases through a portion of the second passage.

18. A diesel engine exhaust treatment and cooling system, the system comprising:
    an exhaust pipe substantially containing and directing exhaust gases generated by the engine;
    an exhaust treatment mechanism disposed on the exhaust pipe, the exhaust treatment mechanism configured to modify the composition of the exhaust gases;
    a regeneration mechanism operatively attached to the exhaust treatment mechanism, the regeneration mechanism configured to regenerate the exhaust treatment mechanism from time to time;

a cooling mechanism disposed on the housing downstream of the exhaust treatment mechanism, the cooling mechanism comprising a plurality of lobes and configured to receive the exhaust gases from the exhaust pipe at a proximal end and expel the exhaust gases through the lobes to the atmosphere at a distal end;

wherein the lobes are longitudinally tapered, becoming larger as they approach the distal end from the proximal end; and wherein the cross-sectional area of the distal end is approximately equal to the cross-sectional area of the proximal end.

19. The system of claim 18, wherein the collective circumference of the lobes is greater than the circumference of the exhaust pipe.

20. The system of claim 18, wherein the exhaust treatment mechanism comprises a diesel particulate filter.

* * * * *